June 1, 1948.    V. RUSSELL    2,442,618
MAGNET TESTER
Filed Sept. 4, 1945
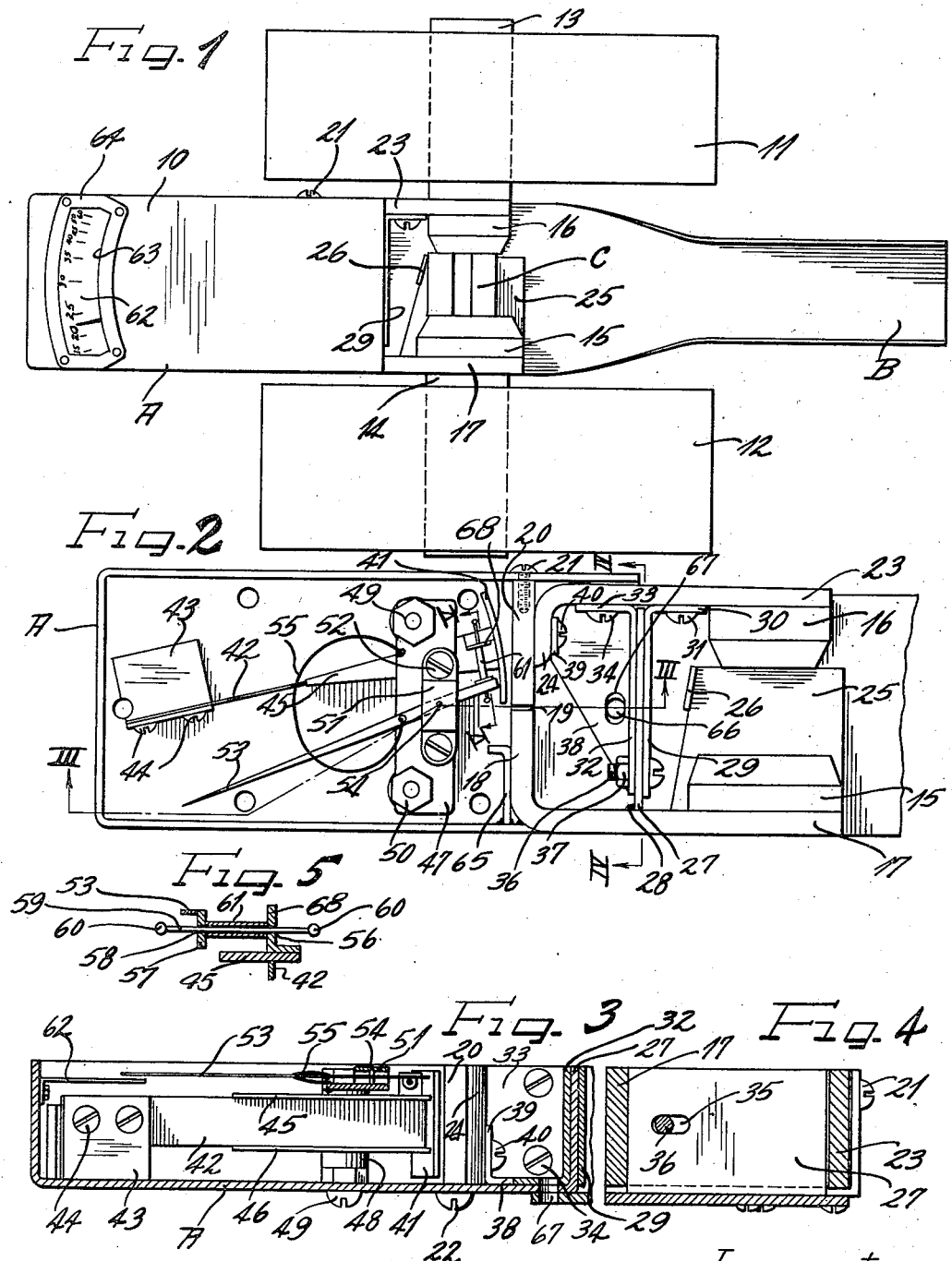
Inventor
Valoran Russell Patented June 1, 1948

2,442,618

UNITED STATES PATENT OFFICE 2,442,618

MAGNET TESTER

Valoran Russell, Morton Grove, Ill.

Application September 4, 1945, Serial No. 614,253

6 Claims. (Cl. 175—183)

The present invention relates to a magnet tester, and more particularly to a hand device in which a permanent magnet is placed and held while being magnetized and after the device with the magnet in it is withdrawn from the magnetizer, it is capable of measurement of the relative amount of magnetism left in the permanent magnet.

The present invention is useful in enabling one to get comparative readings with standard magnets such as permanent magnets for radio speaker units.

The device of the present invention is capable of accommodating itself to receive permanent magnets of standard size which may vary slightly in size within tolerance limits.

It is, therefore, an object of the present invention to provide means for getting comparative readings with standard magnets, such as permanent magnets for radio speaker units.

Another object of the invention is to provide a device capable of accommodating itself to receive permanent magnets of standard sizes which may vary slightly within tolerance limits.

A further object of the present invention is to provide a device for testing permanent magnets of varying sizes within certain limits without varying the air gap so that comparative readings may be taken.

A further object of the present invention is to provide a magnet tester having a magnetic field simulating the field structure of a radio speaker unit for receiving, one after another, a series of permanent magnets for magnetization and comparative reading of the amount of magnetism left in the permanent magnets after magnetization.

The invention has for a further object the provision of a magnet tester having a fixed air gap and a movable pole piece, with means for maintaining the movable pole piece in electrical association with one of the members forming the air gap.

A still further object of the present invention is to provide a magnet tester having a swinging support for the armature, a needle or pointer movable over a dial, and linkage connecting the armature support and needle to swing the needle in accordance with the amount of swing of the armature.

Another and still further object of the invention is to provide means for mounting an armature to define its path of movement, with respect to a magnetic air gap, for close clearance without touching the members forming the gap.

A further object of the present invention is to provide means for connecting two swinging members movable in parallelism in different planes so that the swinging movement of one member will cause swinging movement of the other member and which means accommodates itself to different angular positions of the two members.

The above, other and further objects of the present invention will be apparent from the description and accompanying drawings.

An embodiment of the present invention is illustrated in the accompanying drawing, and the views thereof are as follows:

Figure 1 is a plan view of the device of the present invention and placed in a magnetizer.

Figure 2 is a plan view of the device, with the cover removed, and without the permanent magnet in place, showing details of construction.

Figure 3 is a vertical sectional view taken on the plane of line III—III of Figure 2.

Figure 4 is a vertical section taken in the plane of line IV—IV of Figure 2.

Figure 5 is an enlarged sectional view taken in the plane of line V—V of Figure 2.

The drawing will now be explained.

The device as illustrated comprises a body A and a handle B. A top 10 is applied to the body to cover the mechanism.

11 and 12 are the coils of a magnetizer, and 13 and 14 are the cores. It is understood that when the device is in the magnetizer with the permanent magnet to be magnetized, the magnet is held between the cores 13 and 14 when a uni-directional current is passed through the coils 11 and 12.

Means are provided defining a magnetic field simulating the magnetic field structure of a radio speaker unit. Such means include pole pieces 15 and 16. The pole piece 15 is fastened to a leg 17 which has an angular end piece 18 which forms one of the members defining the fixed air gap 19. The other member 20, forming the fixed air gap, is fastened to the side surface of the body A by screws 21 through a side wall of the body and other screws 22 through the bottom of the body. A leg 23 is fastened to the pole piece 16 and has a bent end 24, sometimes herein referred to as the contactor flange.

The pole pieces 15 and 16 are in opposition to receive between them a permanent magnet C, as illustrated in Figure 1.

A plate 25 is secured to the bottom of the device, and has an upturned lug 26 forming a stop against which the magnet C rests when in place, to assure proper surface contact between the faces of the pole pieces and of the magnet.

A portion of the bottom of the body is upturned forming a wall or plate 27, which is reduced in width to extend between the legs 17 and 23 of the pole pieces, as shown in Figure 2. The plate is welded at 28 to the leg 17 and its outer end clears the leg 23 of the pole piece 16.

A plate 29 having a bent end 30 which is attached to the leg 23 by screws 31 is disposed alongside one surface of the plate 27. A second plate 32 is held against the other face of the plate 27, and has a bent end 33 which is attached to the leg 23 by screws 34. The lengths of the plates 29 and 32 are less than the transverse distance between the legs 17 and 23 and with the plate 27 constitute a guide for the pole piece 16. The plate 27 has an elongated slot 35 for receiving a bolt 36 passing through suitable apertures in the plates 29 and 32. The bolt carries a nut 37 which is screwed against the plate 32 to prevent loss of the nut, but not so tightly as to prevent relative movement between the plates 29 and 32 with respect to the plate 27. This movement is possible because of the provision of the slot 35 in the plate 27 and because of the fact that the nut is not too tight against the plate 32.

The plate 32 has a bottom 38 resting on the bottom of the body and an upturned lug 39 is provided on the bottom in spaced parallel relation from the plate 32. The lug 39 is apertured to receive a screw 40 threaded into the contactor flange 24 of the leg 23.

The pole piece 16 is herein referred to as the movable pole piece, as its mounting, wherein the plates 29 and 32 slide over opposite faces of the plate 27, enables slight movement towards and away from the pole piece 15 to accommodate whatever slight variations there may be in the sizes of permanent magnets being tested, within the usual tolerance limits.

The lug 39 on the bottom 38 of plate 32 and the screw 40 holds the contactor flange 24 in electrical engagement with the member 20 but allows the bent end or contactor flange 24 to slide on the member 20.

The movement of the pole piece 16 is controlled or guided by the engagement of the plates 29 and 32 with the plate 27 which guiding movement maintains the contactor flange 24 substantially in parallelism with the field member 20 which forms one margin of the fixed air gap 19.

Because of the provision of the floating or movable pole piece 16, permanent magnets C having slight variations in size may be readily received between the pole pieces without in any manner affecting the fixed air gap 19.

An armature 41 is mounted for movement towards and away from but never within the air gap in accordance with flux conditions in the gap. This armature is carried on the end of a leaf spring 42 which at one end is fastened to a block 43 suitably secured to the bottom of the body of the device. The spring is fastened to the block by screws 44. In order to rigidify the leaf spring 42 and prevent its bending between the armature and the block 43, top and bottom flanges 45 and 46 are fastened to it, which flanges are preferably triangular in plan as may be observed in Figure 2. The leaf spring 42 bends adjacent the block 43, as it is swung. The armature is arcuate in plan, being struck on a radius the center of which is the point of bend of the leaf spring 42. This contour of the armature is to afford close clearance with respect to the members defining the air gap 19 without touching the members.

A bridge 47 lying above the leaf spring 42 is supported by spacers 48 surrounding screws 49 entered through the bottom of the body with nuts 50 applied to the upper ends of the screws to hold the bridge in place. An offset bracket 51 is attached to the bridge by screws 52. Mounted to swing between the bridge 47 and the offset member 51 is a needle or pointer 53, the same swinging on a pivot 54 entered in suitable apertures or depressions in the bridge and offset member, as illustrated in Figure 3. A wire spring 55 is fastened at one end to the bridge 47 and at the other end to the pointer or needle 53 and functions to maintain the needle in normal or zero position, which is the position shown in Figure 2.

For connecting the leaf spring 42 and the needle 53, to swing the needle as the leaf spring moves by reason of the action of the flux in the air gap 19 on the armature 41, linkage is provided.

It will be noted that the leaf spring 42 and the needle 53 swing in parallelism in different planes.

Attached to the upper flange 45 of the spring 42 is an ear 68 having a hole 56 through it. Attached to the underside of the needle 53 is an ear 57 having a hole 58 through it. A pin 59 extends through the holes 56 and 58 in the ears 68 and 57 and is longer than the maximum distance the leaf spring and needle will be separated, to allow for differences in angular positions of the leaf spring and needle. The pin 59 has heads 60 to prevent the pin from dropping out of the assembly. Surrounding the pin 59 between the ears 55 and 57 is a sleeve 61 the length of which determines the minimum distance between the ears 68 and 57, as may be observed in Figure 2. The pin, sleeve and ears are loosely associated so as to allow free swinging movement of the leaf spring 42 and the needle 53.

The wire spring 55 acting to maintain the needle 53 in normal position will, because of the sleeve 61, hold the leaf spring 42 in normal or inoperative position which is that shown in Figure 2 and which is determined by contact of the rear margins of the flanges 45 and 46 of the leaf spring with the rear screw 49 which holds the bridge 47 in place.

The parts are so arranged that when the leaf spring 42 is at rest against the rear screw 49 and the needle 53 is in its normal or zero position, the end of the armature 41 which is adjacent the air gap 19 is clear of the gap, as shown in Figure 2.

In Figure 2, the leg 23 of the pole piece 16 is shown as spaced from the adjacent side wall of the body. This space is exaggerated in the drawing to show that slight movement of the leg and pole piece is permissible.

Attached to the end wall of the body A is a scale 62 which underlies the extremity of the needle or pointer 53. This scale carries graduations or indicia which may be in Gauss or Maxwell units.

The cover 10 of the body has an arcuate opening 63 which is closed by a transparent piece of material through which the indicia on the scale 62 may be observed. A frame structure 64 retains the transparent member in place.

The pole pieces 15 and 16, legs 17 and 23, the member 20 and the armature 41 are of iron. The other parts of the device are made of non-magnetizable material, such as brass or the like.

A stop 65 is arranged adjacent the member 18 of the leg 17 to limit the swing of the armature 41 as it is influenced by the flux in the air gap 19.

A hole 67 is formed in the bottom of the body and through the plate bottom 38, which hole is elongated in the plate bottom 38 to receive a bolt 66 entered through the bottom of the body and engaging a threaded stud on the interior of the cover 10 to hold the cover in place.

The operation of the device is as follows:

A permanent magnet C is inserted between the pole pieces 15 and 16 and moved against the stop 26. The device is then moved into a magnetizer with the cores 13 and 14 thereof against the pole pieces to magnetize the magnet. As soon as any flux passes through the air gap 19 the armature 41 will be attracted thus swinging the needle 53 to the right, as viewed in Figures 1 and 2. When the magnet has been sufficiently magnetized, the device, with the magnet still in it, is removed from the magnetizer and then a reading on the scale 62 is had, which reading indicates the amount of magnetism left in the permanent magnet after the device with the magnet in it has been removed from the magnetizer.

After a permanent magnet has been magnetized, in the manner described, and a reading made of its residual magnetism, another magnet is inserted in the device and the operation repeated.

In this manner a series of magnets such as are used in radio speaker units, may be magnetized, one after another, and readings taken of the residual magnetism present in every magnet after the magnet is removed from the magnetizer.

In this manner the amount of magnetism left in the various permanent magnets may be compared for such purposes as will be useful in utilizing the magnets in radio speaker units.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

I claim as my invention:

1. A hand tool for holding a permanent magnet in a magnetizing field to charge the magnet and withdraw it when charged, said tool comprising a body and a handle, said body supporting pole pieces and members forming a fixed air gap, one of said gap-forming members comprising a straight bar secured to the bottom of the body crosswise of the same, the other of said gap-forming members comprising a bar of L-shape secured to the bottom of the body with the longer leg lengthwise of the body and supporting a pole piece at the end of the longer leg and with the shorter leg directed toward said straight bar with adjacent ends spaced to form the gap, a second L-shaped bar on the bottom of the body arranged with its longer leg parallel to the longer leg of said first L-shaped bar and at one end supporting a second pole piece in alignment with the first pole piece, the shorter leg of said second L-shaped bar being held against a side surface of said straight bar in magnetic circuit relation, and an arcuate armature pivoted to swing in an arc across but out of said air gap in accordance with the flux across the gap.

2. A hand tool for holding a permanent magnet in a magnetizing field to charge the magnet and withdraw it when charged, said tool comprising a body and a handle, said body supporting pole pieces and members forming a fixed air gap, one of said gap-forming members comprising a straight bar secured to the bottom of the body crosswise of the same, the other of said gap-forming members comprising a bar of L-shape secured to the bottom of the body with the longer leg lengthwise of the body and supporting a pole piece at the end of the longer leg and with the shorter leg directed toward said straight bar with adjacent ends spaced to form the gap, a second L-shaped bar on the bottom of the body arranged with its longer leg parallel to the longer leg of said first L-shaped bar and at one end supporting a pole piece in alignment with the first pole piece, the shorter leg of said second L-shaped bar being held against a side surface of said straight bar in magnetic circuit relation, an arcuate armature pivoted to swing in an arc across but out of said air gap in accordance with the flux across the gap, a scale on said body, and a needle movable over said scale and operatively connected to said armature to swing as said armature is moved by the flux in the gap.

3. A hand tool for holding a permanent magnet in a magnetizing field to charge the magnet and withdraw it when charged, said tool comprising a body and a handle, said body supporting two opposed pole pieces, L-shaped members carrying said pole pieces on the longer legs of said members, one of said L-shaped members being fixed, the other of said L-shaped members being movable toward and away from said one L-shaped member, a straight member fixed in place in alignment with the shorter leg of said fixed L-shaped member and spaced from the end of said shorter leg thereof to provide a fixed air gap, and the shorter leg of the other of said L-shaped members being magnetically connected to said straight member and capable of movement along said straight member to vary the space between said pole pieces without changing the air gap.

4. A hand tool for holding a permanent magnet in a magnetizing field to charge the magnet and withdraw it when charged, said tool comprising a body and a handle, said body supporting two opposed pole pieces, L-shaped members carrying said pole pieces on the longer legs of said members, one of said members being fixed, the other of said members being movable toward and away from said one member, a straight member fixed in place in alignment with the shorter leg of said one L-shaped member and spaced from the end of said leg to provide a fixed air gap, and the shorter leg of the other of said L-shaped members being magnetically connected to said straight member and capable of movement along said straight member to vary the space between said pole pieces, means for guiding the movable L-shaped member to hold it in parallel relation with the fixed L-shaped member and against the straight member, said means including a fixed guide plate on said body and a pair of guide plates fixed to the movable L-shaped member at right angles to it and receiving said guide plate in sliding relation therebetween.

5. A hand tool for holding a permanent magnet in a magnetizing field to charge the magnet and withdraw it when charged, said tool comprising a body and a handle, said body supporting two opposed pole pieces, L-shaped members carrying said pole pieces on the longer legs of said members, one of said L-shaped members being fixed, the other of said L-shaped members being movable toward and away from said fixed L-shaped member, a straight member fixed in place in said body in alignment with the shorter leg of said fixed L-shaped member and spaced from the end of said leg to provide a fixed air gap, and the shorter leg of the movable L-shaped member being magnetically connected to said straight member and capable of movement along said straight member to vary the space between said pole pieces without varying the air gap, means for guiding the movable L-shaped member to hold it in parallel relation with the fixed L-shaped member, said means including a guide plate fixed in the body against movement, a pair of guide plates fixed to said movable L-shaped member at right angles to it and receiving said guide plate in sliding relation therebetween, and said guide plates having cooperating pin and slot connections to limit the extent of sliding movement of said pair of guide plates with respect to said fixed guide plate.

6. A compact hand-carried portable magnet tester adapted to be easily placed between and removed from magnet charging cores comprising a box, a handle projecting therefrom, fixed spaced opposed flux gap defining members in said box, spaced opposed pole pieces in said box each in circuit relation with a separate gap-defining member, one of said pole pieces being shiftable relative to the other pole piece to accommodate therebetween magnets of different size in intimate contact therewith when said pole pieces are placed between the magnet-charging cores, an armature swingably mounted in said box for movement adjacent said flux gap defining members and arranged to be deflected by creation of a flux in said gap, an indicator needle pivotally mounted in said box, and a linkage connecting said needle and said armature construction and arranged to cause co-movement of the armature and needle when the armature is deflected by flux in said gap while allowing relative motion between said needle and armature when the armature returns to its non-deflected position.

VALORAN RUSSELL.

REFERENCES CITED

The following references are of record in the file of this patent:

UNITED STATES PATENTS

| Number | Name | Date |
|---|---|---|
| 642,424 | Brown | Jan. 30, 1900 |
| 1,077,749 | Porter | Nov. 4, 1913 |
| 1,187,054 | Everest | June 13, 1916 |
| 1,776,708 | St. Clair | Sept. 23, 1930 |
| 2,075,504 | Chegwidden et al. | Mar. 30, 1937 |
| 2,305,659 | Arnold | Dec. 22, 1942 |

FOREIGN PATENTS

| Number | Country | Date |
|---|---|---|
| 48,614 | Sweden | Nov. 6, 1918 |
| 276,652 | Great Britain | May 24, 1928 |